United States Patent [19]

Metcalfe et al.

[11] Patent Number: 5,161,387

[45] Date of Patent: Nov. 10, 1992

[54] METHOD AND APPARATUS FOR CONFIGURING AND CONTROLLING A LOAD

[75] Inventors: Alan G. Metcalfe, Onalaska; Tedd P. Johnson; David M. Foye, both of La Crosse, all of Wis.

[73] Assignee: American Standard Inc., New York, N.Y.

[21] Appl. No.: 691,940

[22] Filed: Apr. 26, 1991

[51] Int. Cl.[5] .................. G05D 23/00; F25B 49/00
[52] U.S. Cl. .......................... 62/126; 236/94; 361/166
[58] Field of Search ............ 236/94; 165/11.1; 431/13; 62/126; 361/166; 324/66

[56] References Cited

U.S. PATENT DOCUMENTS

| | | | |
|---|---|---|---|
| 4,538,419 | 9/1985 | Lord | 165/11.1 |
| 4,701,695 | 10/1987 | Chan et al. | 324/550 |
| 4,901,004 | 2/1990 | King | 324/66 |
| 5,065,813 | 11/1991 | Berkeley | 236/94 |

Primary Examiner—William E. Wayner
Attorney, Agent, or Firm—William J. Beres; William O'Driscoll; Peter D. Ferguson

[57] ABSTRACT

A method of determining and controlling a load by a controller. The method comprises the steps of transmitting a signal for a first predetermined time period on an electrical line having a load in parallel with a capacitor; monitoring the electrical line for electrical activity within a second predetermined time period following the first time period; and controlling the load in response to the presence or absence of the electrical activity.

23 Claims, 4 Drawing Sheets

METHOD AND APPARATUS FOR CONFIGURING AND CONTROLLING A LOAD

BACKGROUND OF THE INVENTION

The present invention is directed to the controller of an air conditioning system, and more particularly, to method and apparatus for using a single electrical control line to determine whether a load is present on that line, and then controlling that load using the same line. For purposes of the present invention, a load can mean both a directly controlled device such as a light, an actuator, or a solenoid, or an indirectly controlled device such as a compressor motor actuated by such load controlling circuitry as a relay.

Controllers for refrigeration systems and the like are limited by physical constraints and economics to a finite number of input and output lines. Often the number of available lines is insufficient, especially if certain lines are dedicated to seldom used functions such as system configuration. In system configuration, lines provide a plurality of binary inputs, such as configuration jumpers, DIP switches or the like, to a system controller indicating the connection or non-connection of a particular system load. Multiplexed lines and bus structures are often resorted to in order to obtain more input/output lines. This can be very costly and very complex in terms of system time, data management, and component costs.

SUMMARY OF THE INVENTION

It is an object, feature and advantage of the present invention to combine the functions of input and output lines into a single electrical control line.

It is an object, feature and advantage of the present invention to allow the same line which controls a load to also be used as a configuration input to indicate whether or not the load is connected to the air conditioning system.

The present invention provides a method of determining and controlling a load by a controller. The method comprises the steps of transmitting a signal for a first predetermined time period on an electrical line having a load in parallel with a capacitor; monitoring the electrical line for electrical activity within a second predetermined time period following the first time period; and controlling the load in response to the presence or absence of the electrical activity.

The present invention also provides a method of configuring and controlling a load from a load controller. The method comprises the steps of setting a tri-state output on an electrical line to a high state for a first predetermined time period; setting the tri-state output on the electrical line to an input state for a second predetermined time period; reading the electrical activity on the electrical line during the second predetermined time period; and determining the existence of a load connected to the electrical line based on the presence or absence of electrical activity on the electrical line during the second predetermined time period.

The present invention also provides an electrical circuit. The circuit comprises a load; a capacitor in parallel with the load; and a jumper around the capacitor.

The present invention provides a method of configuring the controller of an air conditioning system. The method comprises the steps of: setting a tri-state port to a high state for a first predetermined time period; changing the tri-state port to an input state for a second predetermined time period; receiving, for the second predetermined period of time, any signals present at the tri-state port; and configuring the controller of the air conditioning system in accordance with the presence or absence of any signals received during the second predetermined time period.

The present invention provides a system for controlling a load. The system comprises: a load; load controlling circuitry; a tri-state port; an electrical line operably connecting the load and the load controlling circuitry to the tri-state port; a capacitor operably connected to the electrical line in parallel to the load controlling circuitry; and means for negating the operation of the capacitor.

The present invention also provides an air conditioning system. The system comprises: a compressor; a condenser; an expansion valve; and an evaporator. The system also includes conduit cyclically connecting the compressor, the condenser, the expansion valve and the evaporator in the listed order; and a plenum including the evaporator and a supply fan At least one condenser fan is operably associated with the condenser. Finally, the system includes means for determining the existence of and controlling the operation of system loads wherein the determining and controlling means includes a jumper around a capacitor.

DETAILED DESCRIPTION OF THE DRAWING

Figure 1:
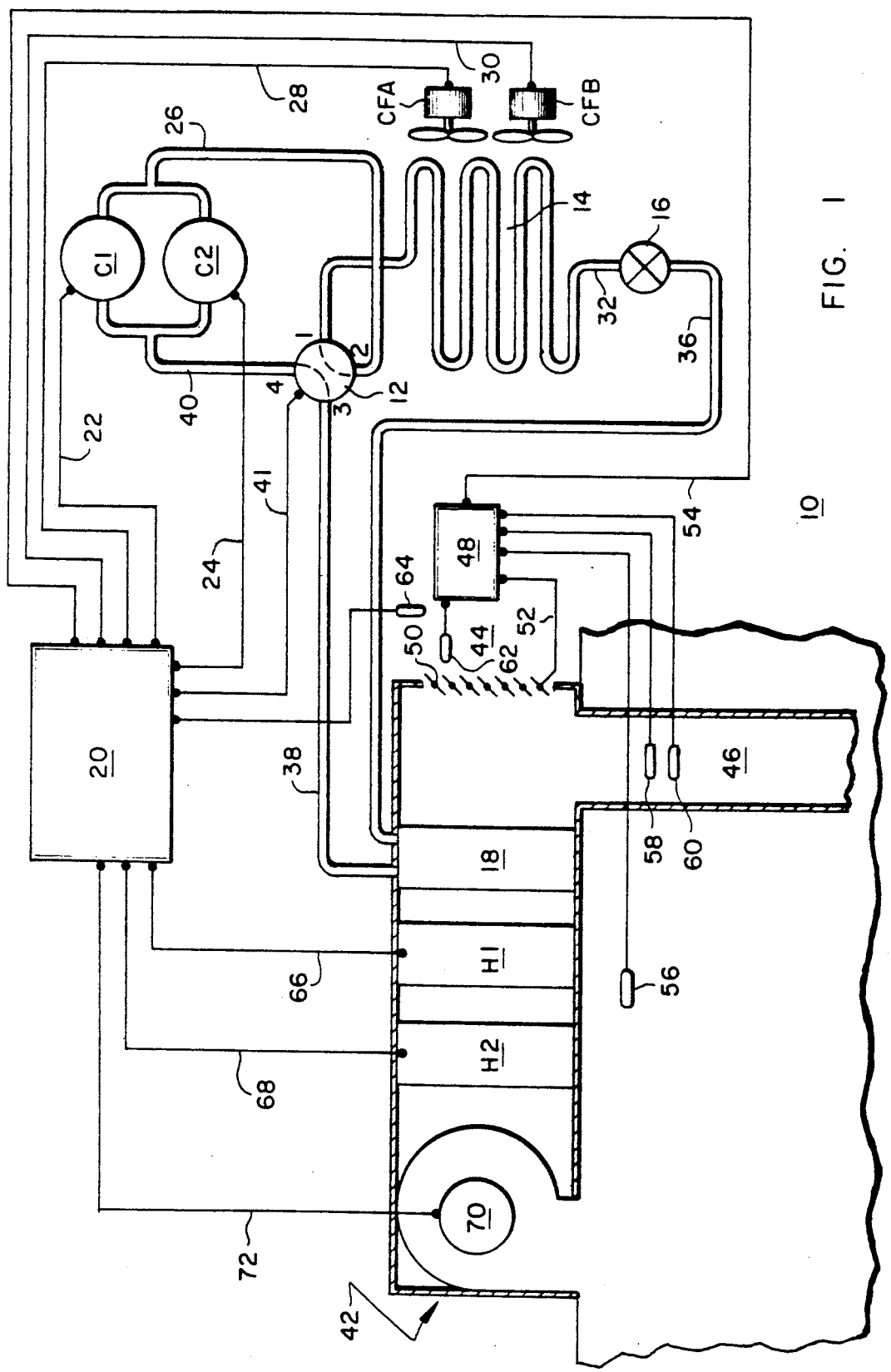
FIG. 1 shows a typical air conditioning system.
Figure 2:
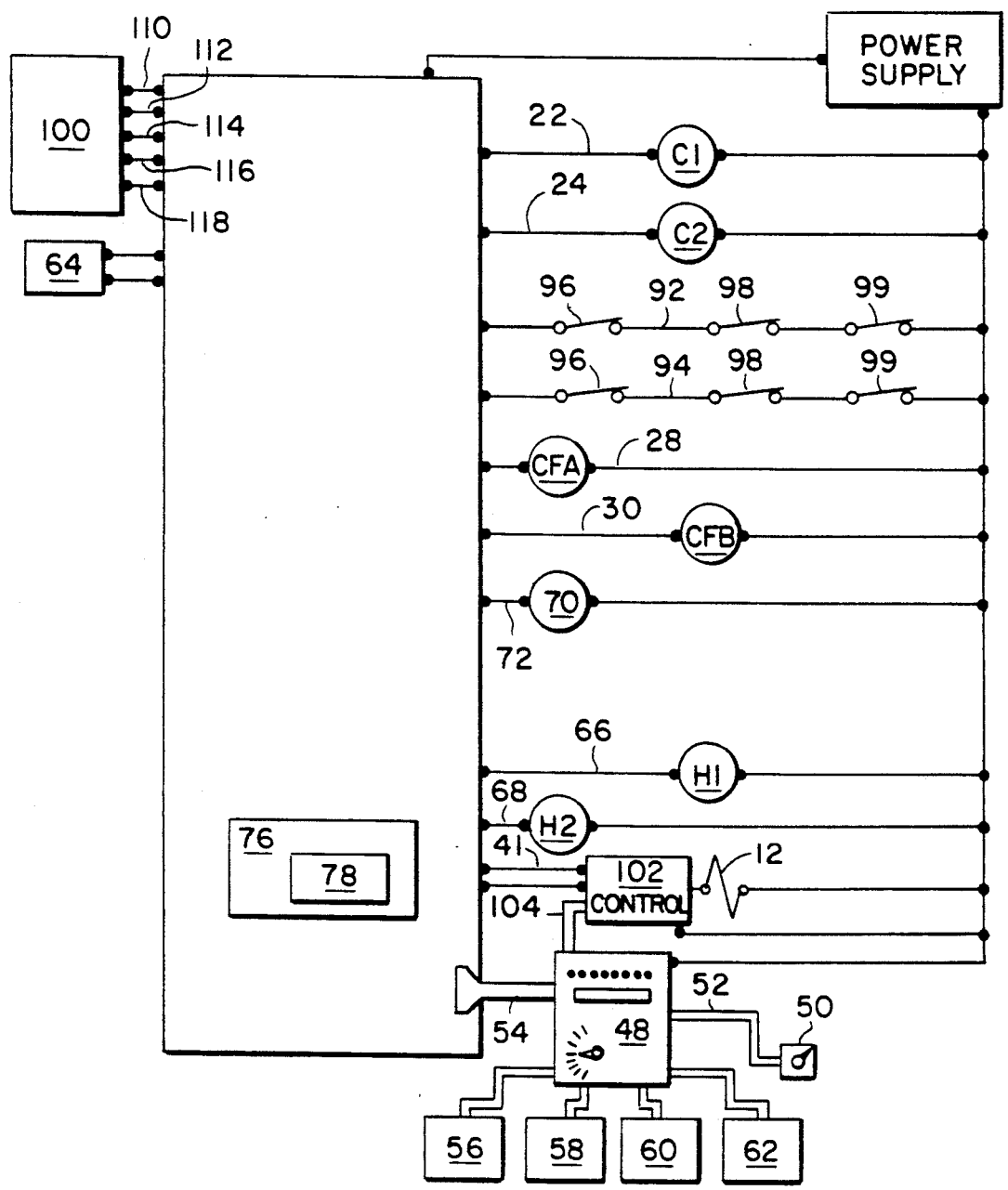
FIG. 2 shows the system controller of the air conditioning system of FIG. 1 including general electrical connections.

FIGS. 1 and 2 show an HVAC system 10 including a first compressor C1, a second compressor C2, a reversing valve 12, an outdoor heat exchanger 14, an expansion device such as an expansion valve 16, an indoor heat exchanger 18, and a system controller 20. The HVAC system, as shown in FIG. 1, is configured as a heat pump system with two compressors and two stages of auxiliary heat. However, the configuration of the actual HVAC system can vary considerably in the number of compressors and heaters. Additionally, the HVAC system can be configured as a cooling only system or as a non-heat pump system.

In FIG. 1 the compressors C1 and C2 are connected in parallel and are selectively energized by the system controller 20 using electrical lines 22 and 24 respectively. A refrigerant line 26 leaving the compressors C1 and C2 is connected through ports 1 and 2 of the reversing valve 12 and a refrigerant line 27 to the outdoor heat exchanger 14 when the reversing valve 12 is in the cooling mode as shown in the configuration of FIG. 1. The outdoor heat exchanger 14 is cooled by two condensing fans CFA and CFB, each of which is independently connected to and controlled by the system controller 20 using electrical lines 28 and 30 respectively. Depending on the condenser design requirements, more or less condenser fans may be utilized.

A refrigerant line 32 leaving the outdoor heat exchanger 14 is connected to the expansion valve 16. The expansion valve 16 is connected to the indoor heat exchanger 18 by a refrigerant line 36. A refrigerant line 38 from the indoor heat exchanger 18 is connected through ports 3 and 4 of the reversing valve 12 to the compressors C1 and C2 by means of refrigerant line 40.

In the heating mode the system controller 20 controls the reversing valve 12 by means of an electrical line 41 so that the refrigerant line 26 leaving the compressors C1 and C2 is connected to the refrigerant line 38 and the indoor heat exchanger 18 through ports 2 and 3 of the reversing valve 12. The indoor heat exchanger 18 exchanges heat with the air passing over it, and cooled refrigerant leaves the indoor heat exchanger 18 passing along the refrigerant line 36 to the expansion valve 16. From the expansion valve 16 the refrigerant enters the outdoor heat exchanger 14 by means of the refrigerant line 32 where the refrigerant absorbs heat and vaporizes. The vaporized refrigerant returns to the compressors C1 and C2 through the refrigerant line 27, ports 1 and 4 of the reversing valve and the refrigerant line 40.

The HVAC system 10 also includes an air handling unit 42 having an outside air connection 44 and a return air connection 46. An economizer 48 can be provided to mix the outside air and the return air using a damper 50 controlled by means of an electrical line 52. The economizer 48 is connected to the system controller 20 by a multiplexed electrical connection 54 and includes sensors to sense supply air temperature 56, return air temperature 58, return air humidity 60, and outside air humidity 62. Also, the system controller 20 is connected to an outside air temperature sensor 64. After the outside air and the return air has been mixed by the economizer 48, the mixed air passes over the coils of the indoor heat exchanger 18. The mixed air then passes over a first auxiliary heater H1 and a second auxiliary heater H2, each of which are connected to the system controller by an electrical line 66 and 68 respectively. Finally, a supply fan 70 impels the mixed air into the space to be cooled. The supply air fan 70 is operably connected to the controller 20 by means of an electrical line 72.

The system controller 20 includes a circuit board 76 supporting a microprocessor 78, such as a NEC series 7800 having both read only memory (ROM) and random access memory (RAM). The system controller 20 is an intelligent device which accepts inputs, makes decisions, and issues commands to the various elements of the HVAC system 10. The inputs to the system controller 20 from a zone sensor 100 include a zone temperature input on electrical line 110, a cooling setpoint on electrical line 112, a heating setpoint on electrical line 114 and a mode of operation input MODE on electrical line 116 for selecting operating modes such as, for example, EMERGENCY HEAT, HEAT, AUTO, COOL or OFF. These inputs are received by the controller 20 on the electrical lines 110, 112, 114 and 116 in the form of analog values which the controller 20 then uses in its decision making processes. The controller 20 and the zone sensor 100 are also joined by a common line 118.

The controller 20 includes a compressor cycling input line 92 for the compressor C1, and a compressor cycling input line 94 for the compressor C2. Each compressor cycling input line 92, 94 includes a series of "make break" connections which provide an indication to the controller 20 that the respective compressor C1, C2 is presently enabled or disabled. The "make break" connection can include, for example, a switch 96 indicating that the evaporator defrost control is requested, a low pressure cutout switch 98, and a building automation system input 99 indicating that the respective compressor C1, C2 is being scheduled off by a building automation system (not shown).

The controller 20 can include a defrost controller 102 connected to the economizer 48 by a connecting line 104 if the economizer 48 is included in the HVAC system 10. The defrost controller is located on the electrical line 41 between the controller 20 and the reversing valve 12 so that the defrost controller 102 can control the reversing valve 12 when defrosting.

In FIGS. 1 and 2 the load controlling connections between the controller 20 and the various loads have been shown as a direct electrical connection between the controller and the individual load for ease of explanation. For example compressor C1 and C2 are shown as being directly controlled by electrical lines 22 and 24 respectively. Condenser fan CFA and CFB are shown as directly controlled by electrical lines 28 and 30 respectively. The supply fan 70 is shown as being directly controlled by electrical line 72. Also the heaters H1 and H2 are shown as directly controlled by electrical lines 66 and 68 respectively, while the reversing valve 12 is controlled by means of an electrical line 41. The term "load" for the purposes of the present invention includes both directly and indirectly controlled devices.

Figure 4B:
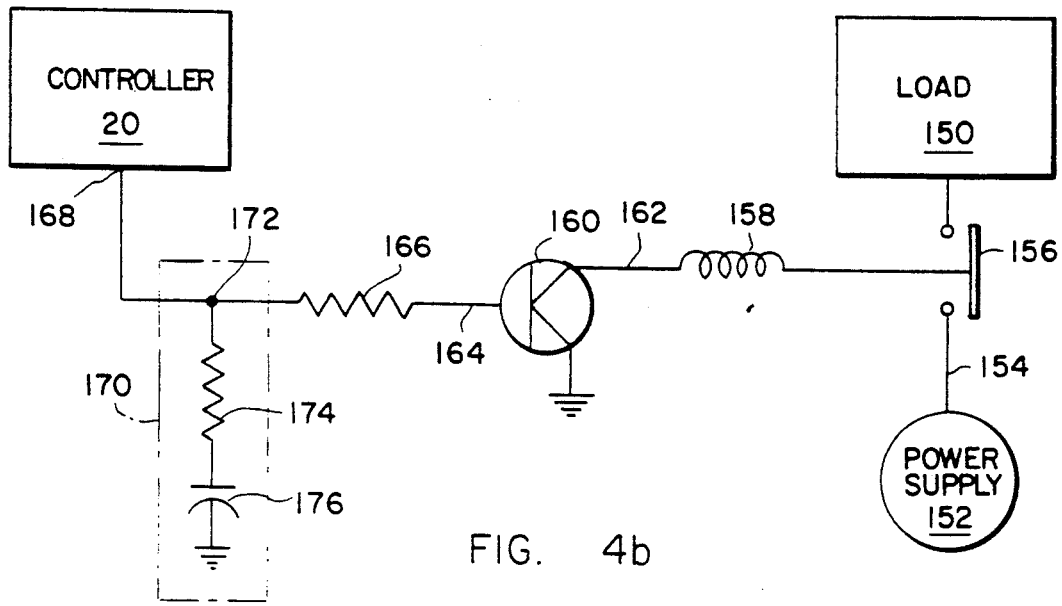
FIG. 4B shows the second embodiment of the present invention configured to indicate the presence of a load in the system.
Figure 3A:
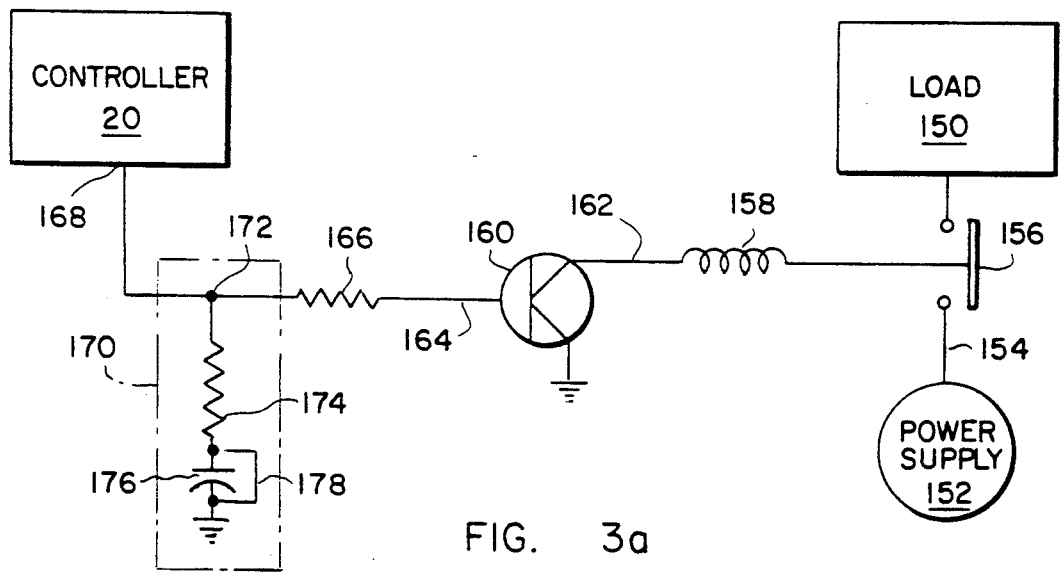
FIG. 3A shows a first embodiment of the present invention configured to indicate the presence of a load in the system.

For example, in FIGS. 1 and 2, each load connected to the controller 20 can either include a indirectly controlled device such as a relay actuated by the voltage level output from the controller 20, or a directly controlled device such as a light, an actuator or a solenoid. An indirectly controlled circuit is shown in FIGS. 3A and 4B where a load 150 is connected to a power source 152 by means of an electrical line 154. The electrical line 154 is open and closed by means of a switch 156 which is actuated by a relay 158. The relay 158 is controlled by a transistor 160 by means of an electrical line 162. The output of transistor 160 on lines 162 is high whenever a transistor input line 164 is also high. This transistor input line 164 includes a limiting resistor 166. The electrical line 164 is directly connected to a controller port 168 thus allowing the controller 20 to activate or deactivate the load by transmitting high or low voltage levels on line 164.

In the present invention the controller port 168 controls the electrical line 164 as a tri-state line having a high state representative of a first predetermined voltage signal from the controller port 168, a low state representative of a second predetermined voltage signal from the controller port 168, and an input state representative of a no voltage output by the controller port 168. Typically the high state causes the transistor 160 to trigger the relay 158 and connect the load 150 to the power supply 152 by closing switch 156. The low state on the tri-state line 164 causes the transistor 160 to cease conducting on line 162 thus opening the switch 156 and terminating the source of power to the load 150. In the input state no signal is transmitted on the electrical line 164 from the controller port 168 and the controller 20 is able to read, using controller port 168, any electrical activity on the electrical line 164.

The present invention adds a circuit 170 to the conventional load control arrangements shown in FIGS. 3A and 4B. The circuit is connected to electrical line 164 at a point 172 where the circuit will be in parallel with the resistor 166, the transistor 160, and the relay 158. The circuit 170 of the present invention includes a limiting resistor 174 in series with a capacitor 176, and a jumper 178 around and in parallel with the capacitor 176. The presence of the jumper 178 prevents the capacitor 176 from charging, while the absence of the jumper 178 allows the capacitor 176 to charge.

FIG. 3A shows a first embodiment of the present invention where the jumper 178 is present thus preventing capacitor 176 from charging. FIG. 4B shows a second embodiment of the present invention where the jumper 178 is absent, thus allowing the capacitor 176 to charge. During system configuration the jumper 178 is either installed or removed depending upon the presence or absence (or vice versa) of a load 150 on the electrical line 164. Thus the presence or absence of the jumper 178 is indicated by whether or not a capacitor 176 can charge.

Figure 4A:
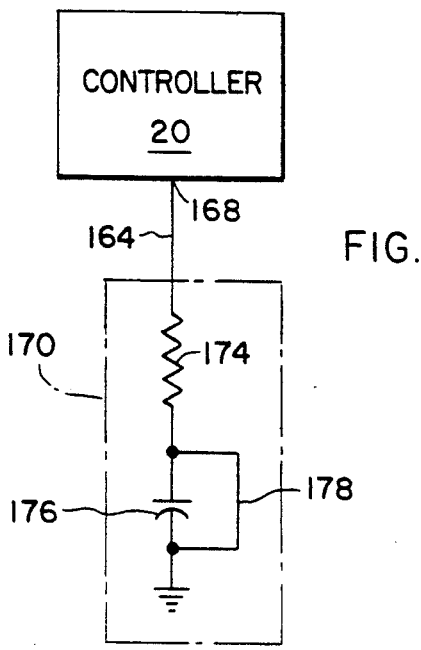
FIG. 4A shows a second embodiment of the present invention configured to indicate the absence of a load in the system.

In the first embodiment shown in FIG. 3A the presence of the jumper 178, and the lack of charge on capacitor 176, is used to indicate the presence of a load 150 which can be controlled by the controller 20. In the counterpart circuit of FIG. 3B the absence of the jumper 178 allows the capacitor 176 to charge thus indicating to the controller 20 that a load is not present in the system. FIGS. 4A and 4B show the opposite arrangement, where the presence of the jumper 178 in FIG. 4A precludes the capacitor 176 from charging and thus indicates to the controller that a load is not present in the system. On the other hand in FIG. 4B the absence of the jumper 178 allows the capacitor 176 to charge, thereby indicating to the controller 20 that the load 150 is present in the system.

Figure 5A:
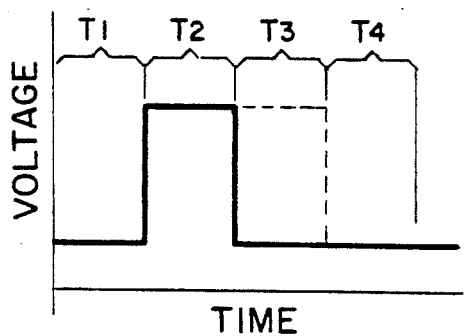
FIG. 5A is a time versus voltage graph applicable to the circuits shown in FIGS. 3A and 4A.
Figure 5B:
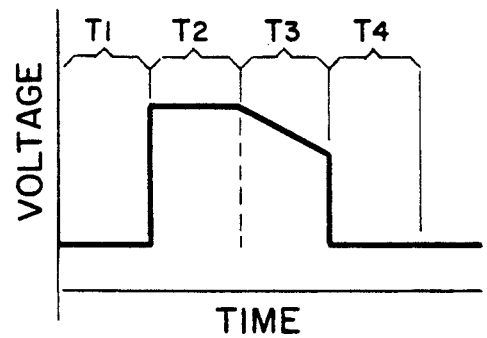
FIG. 5B is a time versus voltage graph applicable to the circuits shown in FIGS. 3B and 4B.

How the controller 20 makes this determination is described more completely with reference to FIGS. 5A and 5B. Central to the concept of the present invention is the existence of a load response period ($T_r$) which is defined as the time period between the time of transmission of a high or low state signal on the electrical line 164 from the controller port 168, and the time at which the load is able to respond to the high or low state signal and accomplish the load's purpose. This load response period $T_r$ is small but determinable for any particular load. Keeping in mind that the load has a load response period $T_r$ of known duration, the controller 20 sends a high state signal out the controller port 168 on the electrical line 164.

Figure 3B:
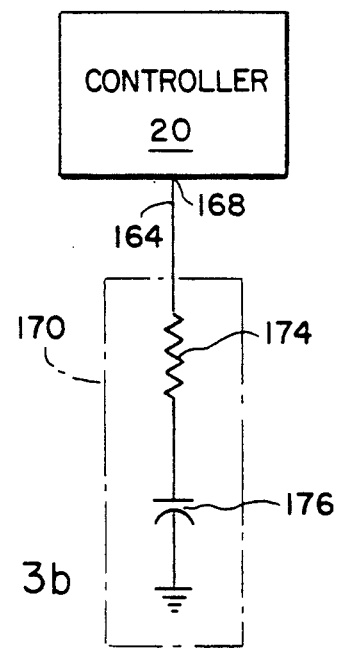
FIG. 3B shows the first embodiment of the present invention configured to indicate the absence of a load in the system.

If the jumper 178 is present in the first embodiment shown in FIG. 3A, the capacitor 176 will not be able to charge. However if the jumper is not present as is shown in FIG. 3B, the capacitor 176 will charge. The controller 20 only sends this high state signal on the electrical line 164 for a time period $T_2$ as shown in FIGS. 5A and 5B. After the expiration of the time period $T_2$, the controller 20 causes the controller port 168 to change state to the input state. In this input state the controller 20 reads, through the controller port 168, the electrical activity on the electrical line 164. In particular, during a time period $T_3$ as soon as possible following the time period $T_2$, the controller 20 looks for the presence, as shown in FIG. 5B, or the absence, as shown in FIG. 5A, of capacitor discharge from the capacitor 176. At the end of the time period $T_3$ and before the expiration of the time period $T_R$, the controller 20 sends a low state signal out the controller port 168 on the electrical line 164 to positively terminate the input state and ensure no undesired load reaction occurs such as turning on or rattling. This is shown in FIGS. 5A and 5B as the time period $T_4$.

Thus in the first embodiment the presence of capacitor discharge such as is shown in time period $T_3$ of FIG. 5B indicates to the controller 20 that the circuit arrangement output port 168 is that shown in FIG. 3B, i.e. a load is not connected to the output port 168. On the other hand, the absence of capacitor discharge from capacitor 176 as shown in FIG. 5A indicates to the controller 20 that the circuit arrangement shown in FIG. 3A is present at the controller port 168, i.e. a load 150 is connected to the controller port 168. The controller 20 configures itself accordingly and controls the load 150 accordingly.

The second embodiment is shown in FIGS. 4A and 4B is essentially the opposite of the first embodiment. The presence of capacitor discharge as shown in FIG. 5B indicates that the arrangement of FIG. 4B is present and a load is not connected to the controller port 168, while the absence of capacitor discharge as shown in FIG. 5A indicates that the arrangement of FIG. 5A is present and a load is not connected to the controller port 168. The controller 20 then configures itself accordingly and may control the load 150 if the load 150 is present. The presence or absence of capacitor discharge may also be used to configure the use of a load, or the operation of a special function by affecting the logic of the controller 20.

Figure 6:
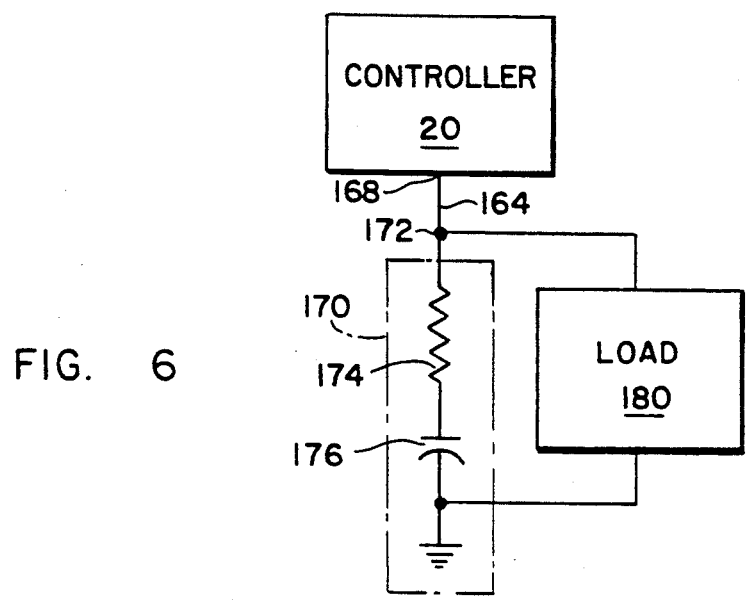
FIG. 6 is a third embodiment of the present invention.

FIG. 6 shows a third embodiment of the present invention where the load 180 to be controlled itself acts as the jumper around the capacitor 176. The presence of the load 180 will preclude the capacitor 176 from charging while the absence of the load 180 will allow the capacitor 176 to charge. Thus, the presence or absence of capacitor discharge during the time period $T_3$ will indicate the respective absence or presence of the load 180.

Essential to the present invention are the use of a tri-state controller port 168 which allows the use of a high and low state to control the load, and the use of the input state to read the presence or absence of capacitor discharge. Also essential to the present invention is the use of time periods $T_2$ and $T_3$ for sending a high signal and reading capacitor discharge respectively, where the sum of time period $T_2$ plus time period $T_3$ is less than the load response period $T_r$. This means that neither the high state signal transmitted by the controller 20 during time period $T_2$ nor the capacitor discharge from the capacitor 176 during time period $T_3$ will be efficient to actuate the load or cause any undesired reaction.

Although the first and second embodiments have been described above in connection with a tri-state controller port, and the presence or absence of a jumper around a capacitor, it is apparent that many alterations and modifications may be made without departing from the subject invention. For example, instead of closing a normally open relay to turn on a load, the invention could be implemented in a form that opens a normally closed relay to turn off a load. It is intended that all such alterations and modifications be considered within the spirit and scope of the invention as defined in the following claims. Additionally, the invention has been described in reference to an air-conditioning system but clearly can be applied to other load controllers.

What is claimed and desired to be secured by Letters Patent of the United States is:

1. A method of determining and controlling a load by a controller comprising the steps of:
   transmitting a signal for a first predetermined time period on an electrical line having a load in parallel with a capacitor;
   monitoring the electrical line for electrical activity within a second predetermined time period following the first time period; and
   controlling the load in response to the presence or absence of the electrical activity.

2. The method of claim 1 including the further step of placing a jumper around the capacitor.

3. The method of claim 1 including the further step of removing a jumper from around the capacitor.

4. The method of claim 1 including the further step of setting the first and second time periods to be less than a response period of the load.

5. A method of configuring and controlling a load from a load controller comprising the steps of:
   setting a tri-state output on an electrical line to a high state for a first predetermined time period;
   setting the tri-state output on the electrical line to an input state for a second predetermined time period;
   reading the electrical activity on the electrical line during the second predetermined time period; and
   determining the existence of a load connected to the electrical line based on the presence or absence of electrical activity on the electrical line during the second predetermined time period.

6. The method of claim 5 including the further step of controlling the load if the load is determined to exist.

7. The method of claim 5 including the further step of setting the first and second predetermined time periods to be less than a response time of the load.

8. The method of claim 5 including a further step of placing a jumper around a capacitor.

9. The method of claim 5 including the further step of removing a jumper from around a capacitor.

10. A method of configuring the controller of an air conditioning system comprising the steps of:
    setting a tri-state port to a high state for a first predetermined time period;
    changing the tri-state port to an input state for a second predetermined time period;
    receiving, for the second predetermined period of time, any signals present at the tri-state port; and
    configuring the controller of the air conditioning system in accordance with the presence or absence of any signals received during the second predetermined time period.

11. The method of claim 10 including the further step of placing the tri-state port in a high or low state to control the activation or deactivation of a load.

12. The method of claim 10 including the further step of setting the first and second predetermined time periods to be less than a load response time period.

13. The method of claim 10 including the further step of placing a jumper around a capacitor.

14. The method of claim 13 wherein the jumper is a load to be controlled by the controller.

15. The method of claim 10 including the further step of removing a jumper from around a capacitor.

16. A system for controlling a load comprising:
    a load;
    a load controlling circuitry;
    a tri-state port;
    an electrical line operably connecting the load and the load controlling circuitry to the tri-state port;
    a capacitor operably connected to the electrical line in parallel to the load controlling circuitry; and
    means for negating the operation of the capacitor.

17. The system of claim 16 wherein the capacitor negating means includes a jumper bypassing the capacitor.

18. The system of claim 17 wherein the load is the jumper.

19. An air conditioning system comprising:
    a compressor;
    a condenser;
    an expansion valve;
    an evaporator;
    conduit cyclically connecting the compressor, the condenser, the expansion valve and the evaporator in the listed order;
    a plenum including the evaporator and a supply fan;
    at least one condenser fan operably associated with the condenser; and
    means for determining the existence of and controlling the operation of system loads;
    wherein said determining and controlling means includes a jumper around a capacitor.

20. The system of claim 19 wherein said determining and controlling means includes means for sending a timing pulse of a first duration, and means for monitoring electrical activity for a time period of a second duration following said first time period, where the lengths of the first and second time periods is less than a load response time.

21. The system of claim 19 including a controller operatively associated with the determining and controlling means.

22. The system of claim 21 wherein the controller is operably connected to a system load by means of a tri-state port and an electrical line.

23. The system of claim 19 wherein the jumper comprises a system load.

* * * * *